Feb. 11, 1947.  C. A. FRISCHE ET AL  2,415,430
AUTOMATIC PILOT WITH AUTOMATIC BANKING
Filed July 28, 1942  2 Sheets-Sheet 2

INVENTORS,
CARL A. FRISCHE,
PERCY HALPERT, and
JEFFERSON R. WILKERSON,
Herbert H. Thompson
THEIR ATTORNEY Patented Feb. 11, 1947

2,415,430

UNITED STATES PATENT OFFICE 2,415,430

AUTOMATIC PILOT WITH AUTOMATIC BANKING

Carl A. Frische, Great Neck, Percy Halpert, Kew Gardens, and Jefferson R. Wilkerson, Bayside, N. Y., assignors to Sperry Gyroscope Company, Inc., Brooklyn, N. Y., a corporation of New York Application July 28, 1942, Serial No. 452,662

23 Claims. (Cl. 244—77)

This invention relates to automatic pilots for aircraft and, more particularly, to means for obtaining improved control from the several position-maintaining instruments ordinarily used, so that hunting is prevented, the plane is automatically banked during a turn at the correct angle, and the control system is simplified to eliminate part of the mechanism heretofore employed.

By careful investigation of the banking phenomenon at various rates of turn, we have found that after the turn is once initiated and the plane properly banked, the rudder is substantially centralized, so that the turn is maintained substantially entirely by the ailerons. If the plane is not banked at the proper angle for the rate at which it is turning, side slipping will occur toward the turn center if the plane is not turning fast enough for the banking angle (or, what is the same, if the banking angle is too large for the rate of turn), thus increasing the rate of turn, while if the plane is turning too fast for the banking angle, or if the banking angle is too small for the rate of turn, side slipping or "skidding" away from the center of the turn will occur, thus decreasing the rate of turn. By providing the plane with an accurate means for setting up and maintaining a predetermined rate of turn by rudder adjustment, the resulting change in rate of turn due to improper banking angle will produce a continuing rudder signal causing displacement of the rudder to bring the rate back to its predetermined value and hold it there. By further providing an additional delayed action connection between the rudder signal and the signal controlling the ailerons and thus the banking angle, such continued rudder signal will cause readjustment of the ailerons and banking angle until, finally, the airplane is turning at the desired rate and banked at the correct angle, with the rudder centralized.

We prefer to supplement the above mentioned automatic banking arrangement by an additional means which is brought into operation at least as soon as the signal for a turn is initiated. Preferably, such initial banking device is brought into operation by the turning signal itself and is preferably proportioned to the rate of turn which is set up.

A further object of our invention is to improve the automatic control circuits, and especially that portion pertaining to the means for obtaining the rate and acceleration components from the original displacement signal. We have found that such rate-taking circuits should preferably not be applied to the signal obtained from the course or attitude change knob on the plane, especially those signals obtained from the elevator and aileron knobs. Hence, in our amplifying device we apply the rate-taking circuits to the displacements signals only and bypass the rate circuits with the signals from the attitude changing transmitters or signal generators. Preferably, also, the delayed action signal between the rudder servo amplifier and the aileron servo amplifier also bypasses the rate circuits in the latter. Also, the borometric or level flight signal likewise bypasses the rate circuits in the elevator servo amplifier.

To further insure the safety of operation of the craft, we prefer to interpose limiting or maxima devices, such as voltage limiters, in the signal systems other than those received from normal course departures or attitude changes. Such devices are for the purpose of avoiding a saturated condition of the tubes, transformers and other associated parts which might arise in case of large attitude change signals. Such a condition would virtually render the controls insensitive to the essential gyro controls for the time being, and thus endanger the safe navigation of the craft.

Further purposes and improvements secured by our invention will be apparent from the following description.

Referring to the drawings, illustrating diagrammatically our invention as applied to an aircraft.

Figure 1:
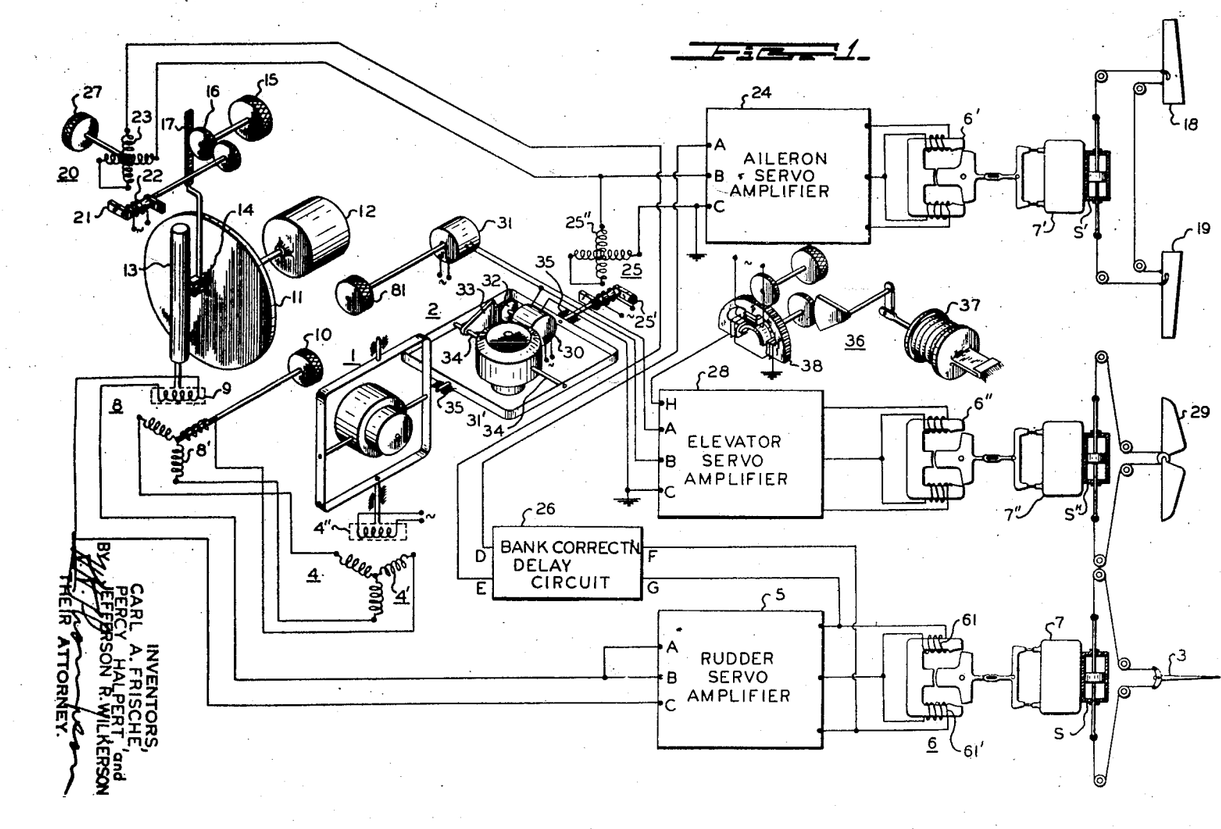
Fig. 1 is a diagram illustrating our automatic control system in combination with an elementary wiring diagram.

Referring to Fig. 1, the azimuth position-maintaining or compass device for controlling the steering of the aircraft is shown as the usual form of directional gyroscope 1, while the control about the two horizontal axes of the craft, in pitch and roll, is exercised from the usual form of gyro-vertical 2. The directional gyroscope is shown as controlling the rudder 3 through any suitable form of pick-off device 4, which in this instance is in the form of an alternating current electrical transmitter of the "Selsyn" type.

The single-phase-type winding 4" of the transmitter 4 is carried by the directional gyro vertical ring and is energized from any suitable source of alternating current, thereby producing triple alternating voltages in the polyphase-type winding 4' relatively fixed to the craft, these voltages corresponding to the relative positions of these two windings. Instead of providing a course change device at the gyroscope and transmitting course signals from transmitter 4 directly to the rudder servo amplifier 5, we prefer to interpose a differential device 8 of the "Selsyn" signal generator type. The windings 4' are connected respectively to the corresponding polyphase-type winding 8' of such signal transformer or generator 8 which may be positioned by a control knob 10 to change course, as will be described, but is normally fixed. While the single-phase winding 9 of generator 8 may be fixed, we prefer to actuate it in a manner to be described. Such winding produces a signal output whenever its position relative to winding 8' differs from the position of winding 4" relative to winding 4'. The signal thus produced is led to the rudder servo amplifier 5, of the type shown more in detail in Fig. 2, which actuates a torque motor 6 to control the relay or pilot valve 7 of the rudder servomotor S, which in this instance is shown as of the hydraulic type, and may be of the type shown in the lower part of Fig. 1 of Patent No. 2,398,421, issued April 16, 1946, for Electrohydraulic control systems, in the name of C. A. Frische, G. P. Bentley and P. Halpert, two of these inventors being joint inventors in the present case. In this type of system, the force which the servo exerts on the control surfaces is proportional to the signal.

From the above it will be clear that so long as the craft maintains the proper heading, zero signal is produced by generator 8 and rudder 3 remains centralized. Should the craft heading change for any reason, winding 4' of transmitter 4, fixed to the craft, will rotate relative to winding 4", fixed to the gyro 1 which maintains its orientation in space, so that a signal is produced by signal generator 8, which applies the proper force to rudder 3 to return and maintain the craft on its predetermined heading by returning winding 4' into the proper position relative to winding 4". As will be seen below, amplifier 5 includes anti-hunting means in the form of rate circuits producing velocity and acceleration components from the displacement signal output from generator 8, which, when applied to servo S, prevent yawing or hunting and accurately maintain the craft heading.

A chance of course may be produced by directly turning one of the windings 8', 9 relative to the other, as by means of the course change knob 10, whereupon the rudder will be actuated until the craft turns winding 4' into the same relation to winding 4" as winding 8' bears to winding 9.

On the other hand, a turn at a predetermined rate may be secured by turning one part of the generator 8 at the desired rate of turn. To effect this purpose, we have shown a variable speed drive for setting up the desired rate. This is shown in the form of a friction disc 11 driven at a constant rate from a constant speed motor 12. A cylinder 13 is driven at a variable rate from this disc 11 through a radially-slidable ball carriage 14 which is radially positioned on the disc 11 as by means of a rate-of-turn knob 15, which is shown as positioning the ball carriage 14 by means of a pinion 16 and rack bar 17. In this way signal generator 8 attempts to produce a constantly increasing signal, which is "wiped out" by the turning action of the craft. By proper design, the turning of the craft will follow the rotation of winding 9 very closely, so that the rate of turn of the craft will be the same as the angular displacement of turn control 15.

Part of our automatic bank device comprises means for immediately causing an adjustment of the ailerons 18 and 19 upon setting up the rate of turn. To this end, we have shown an alternating current transmitter 20 which is directly turned by the turning of the rate knob 15. This transmitter is shown as of the "Telegon" type wherein all windings are stationary, and only a soft iron armature 21 is rotated. The armature 21 is shown as of soft iron, Z-shaped, within the stationary winding 22, to which alternating current is applied. The field winding comprises two oppositely-connected perpendicular coils 23, the output voltage from which is fed to the aileron servo amplifier 24 in series opposition with the voltage produced by the pick-off device 25 on the roll axis of the gyro-vertical 2. This pick-off device 25 is shown as of the same type as transmitter 20, and its output voltage is led to the terminals B and C of the aileron amplifier 24, terminal C being grounded. The output of transmitter 20 is also connected in series with the output terminals D and E of the bank correction delay circuit 26, shown more in detail in Fig. 3, and the resultant of these three series voltages is impressed on the terminals A and C of the aileron amplifier 24.

Neglecting for the moment the effect of the bank correction circuit 26, and assuming that the output voltage of transmitter 20 is zero, it will be seen that the banking attitude of the craft is controlled from the gyro-vertical 2 through the gyro roll pick-off 25. For level flight, the output voltage from pick-off 25 is also zero. If the craft rolls, a signal is produced by the relative displacement between the armature 25' of pick-off 25, which is fixed to the roll axis of the gyro-vertical 2 and hence maintains its position in space, and the stator windings 25" which roll with the craft. This signal actuates the aileron amplifier 24 and serves to adjust the ailerons so as to return the craft to its level attitude. Antihunt means are included in amplifier 24, as will be described below, and the craft is thus maintained level.

If a bank control signal is produced by transmitter 20, it will act also to adjust the ailerons until the input to amplifier 24 is zero. If this signal is constant, the craft must bank until an equal and opposite signal is produced by roll pick-off 25. Such a bank control signal may be produced by rotation of either the armature 21 or the windings 23 of transmitter 20, relative to the other. Thus it will be clear that angular displacement of turn control 15, which initiates a constant rate of turn proportional to this displacement, will also produce a proportional amount of bank by its displacement of armature 21 of transmitter 20. For manual control of the banking angle alone, we have shown a banking control knob 27, which is shown as angularly adjusting the field windings 23 of the transmitter 20 to produce a proportional amount of bank in the manner already described.

By the present invention, a turn is initiated by displacement of turn control 15 to the proper position. This sets in a predetermined rate of turn and simultaneously therewith a predetermined amount of bank proportional thereto. If the banking angle is not correct, the craft will either slip toward the center of the turn for too great a banking angle, or will skid outward from the turn for too small a banking angle, as explained above. Since these effects tend to change the rate of turn of the craft, the rudder will be deflected from its centralized position both by such side slip and by the rudder control system described above to maintain the rate of turn set in, and accordingly the rudder will be maintained deflected to maintain the proper rate of turn. This condition is evidenced by a fixed voltage appearing across terminals F and G of the rudder torque motor 6, the magnitude and polarity of this voltage being dependent upon the amount and direction of deflection of the rudder 3, or more precisely, upon the pressure exerted on the rudder and the direction of such pressure. According to the invention, this signal appearing across terminals F and G is utilized to correct the banking angle. Thus, this signal is led to the bank correction circuit 26, which amplifies and delays the signal, and the resultant correction voltage produced thereby across terminals D and E is inserted in series with the voltage output of bank transmitter 20. This correction voltage is made of such a sense that the resultant deflection of the ailerons 18 and 19 thereby produced will produce the correct banking angle for the particular rate of turn set in. In this manner, any departure from the correct banking conditions, due for instance to a change in air speed, will be automatically compensated by the action of the correction signal derived from output of rudder servo amplifier 5 which supplies current to the rudder torque motor 6 in response to an incorrect banking condition.

The delay within the bank correction circuit 26 is desirable in order to permit the craft to enter its turn and bank before the correction is applied, so that the correction applied will correspond to the actual turn condition rather than to the transient condition existing while the craft is entering the turn. In addition, such delay may be desirable to counteract the effects of the rate circuits within the aileron servo amplifier 24 if the correction voltage is subject to these circuits, so that the aileron servo output will be responsive only to the average value of the bank correction voltage derived from terminals D and E and not to the instantaneous variations thereof, which may lead to undesirable strains in the craft and fluctuations in the banking angle. Also, the delay thus introduced serves to damp and prevent hunting in the system wherein the rudder signal controls the aileron servo through the delay circuit to bank the craft and thereby decrease the rudder signal. Furthermore, this delay permits the gyro-vertical 2 to stabilize the banking attitude of the craft with respect to quickly applied effects, such as gusts of wind, which might tend to change the angle of bank, without being affected by the change in rudder signal thereby produced.

The elevator servo amplifier is shown at 28, which controls, in a similar manner, the elevating control surface 29. This amplifier 28 is controlled in a similar fashion from an electromagnetic pick-off 30 positioned on the pitch axis of the gyroscope 2, corresponding in function to pick-off 25, and also from a manual pitch control device 31 similar in function to transmitter 20, for controlling climbing and diving of the craft, said devices 30 and 31 being differentially connected to control the amplifier 28. It may be noted that we prefer to mount the device 30 within the gimbal ring 31' of the gyroscope so as to avoid the usual ball or loop construction, the transmitter being geared by means of pinion 32 and segmental gear 33 to the trunnion 34 pivotally supporting the gyro case, so that the pick-off 30 is rotated upon relative tilt of the gyro and airplane about a transverse axis along trunnion 34. The major gimbal axis 35—35 is shown in this instance as fore and aft of the craft.

It is to be noted that the transmitter and pick-off devices 20, 25, 30, 31 need not be of the "Telegon" type as shown, but may be of any type adapted to yield variable magnitude reversible-phase alternating signals corresponding in magnitude and phase to the magnitude and sense of displacement of a control member, such as bank control 27, pitch control 81 or the gyro-vertical pivots 34, 35.

It is obvious that transmitter 4 and signal generator 8 of the rudder control system may be replaced by oppositely-connected pick-offs of the type used for the aileron and elevation control systems, and vice versa.

Figures 2, 3:
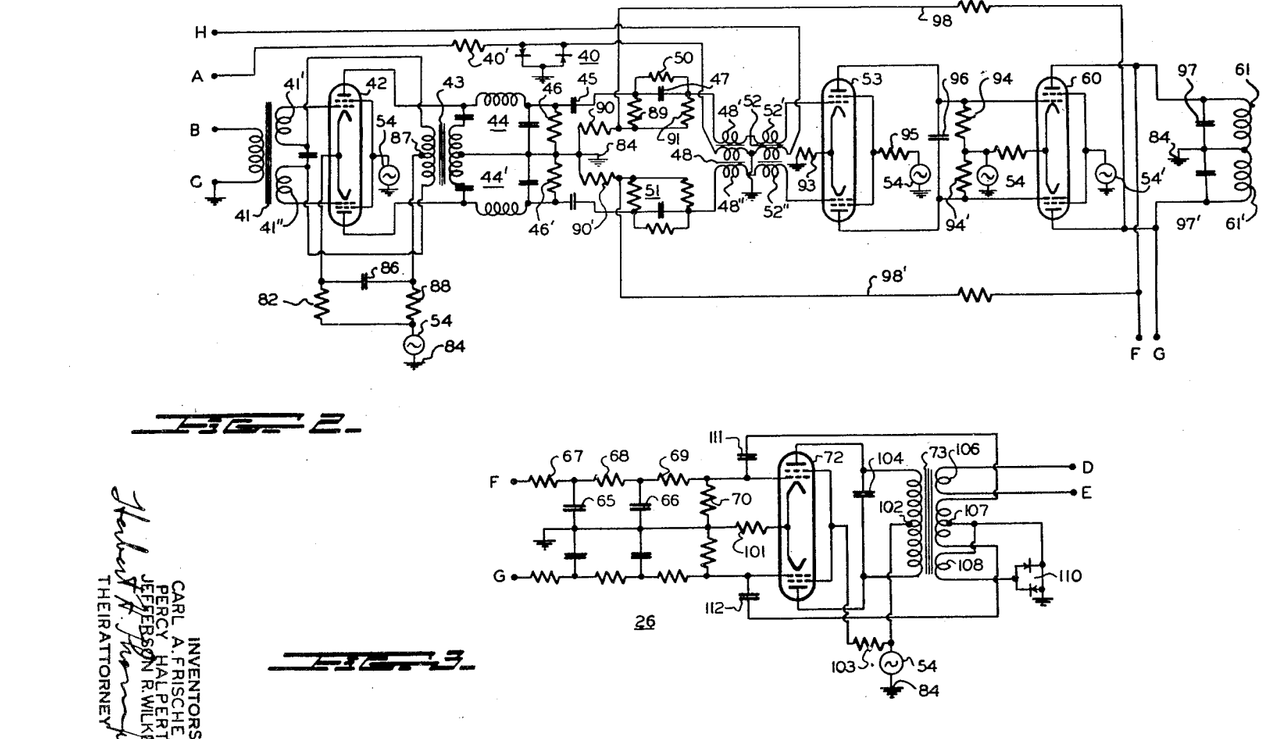
Fig. 2 is a complete wiring diagram of one of the three servo amplifiers shown in Fig. 1.
Fig. 3 is a wiring diagram of the bank correction delay circuit used in Fig. 1.

The three servo amplifiers may be of similar construction, although in certain cases some connections are not employed and may be omitted, if desired. The wiring diagram of such an amplifier is shown in Fig. 2 and in this figure the connections A, B and C correspond to the connections A, B and C on each of the servo amplifier units 5, 24 and 28. An additional connection H is shown at the top of the figure which is only utilized for the elevator amplifier 28. This connection is for the purpose of bringing in the signal from an automatic altitude controller 36, in which a barometric device 37 is employed to vary the position of an electromagnetic pick-off device 38, as more fully disclosed in the copending application of S. Kellogg, G. N. Hanson and T. W. Kenyon, Serial No. 430,736, filed February 13, 1942, for Aircraft altitude control, assigned to the assignee of the present invention. In case the altitude changes, a signal is produced in the pick-off device 38 which is connected to input terminals H and C (ground) of the elevator amplifier 28, so as to bypass all of the rate circuits hereinafter described for the reasons hereinafter more fully explained. An automatic climb or glide control, as described in this application Serial No. 430,736, may also be incorporated in altitude control device 36.

The otuput signal from the gyro-controlled pick-off 25 or 30 is applied between the points B and C of the corresponding amplifiers 24 or 28, while the outputs from the manually-controlled transmitters 20 or 31 are applied between the points A and B of these amplifiers. Therefore the output from the manual control signal transmitter combined with the gyro signal bypasses the rate circuits within the amplifier, as will be described, and may be provided with a voltage limiter 40 to limit the amount of control which may be exerted in this manner. We find, however, that such precautions are not necessary in the case of the rudder servo amplifier, so that points A and B of the rudder amplifier may be connected together as indicated in Fig. 1.

Each of the alternating current signals received from the respective gyro pick-offs is shown as led into the corresponding amplifier through a balanced transformer 41 whose double secondary windings 41' and 41" oppositely energize the control grids of the duplex phase-sensitive detector and rectifier tube 42. The cathodes of tube 42 are joined together and are connected through a cathode-biasing resistor 82 and a source 54 of alternating current to ground at 84. The anodes of tube 42 are connected through respective smoothing filters 44, 44' to respective output resistors 46, 46', whose junction is grounded at 84. The screen grids of tube 42 are connected to ground through A. C. source 54', which is in phase with source 54 but of lesser magnitude, whereby the screen grids are always of the same polarity as but of lower potential than the anodes.

Source 54 is of the same frequency as that of the signal applied to transformer 41, and is adjusted to be in phase coincidence or phase opposition with the voltages impressed on the grids of tube 42 from winding 41', 41" of transformer 41. Since these voltages are of opposite phase, it will be clear that source 54 and hence the anodes will always be in phase coincidence with one grid voltage and in phase opposition with the other grid voltage. Accordingly one section of tube 42 will conduct more than the other during the half cycles of source 54 when the anodes are positive, and resultant unidirectional differential voltages will be produced across resistances 46, 46', whose difference varies in magnitude and polarity with the strength and phase of the signal from the gyro pick-off impressed on transformer 41.

For stabilizing and balancing the circuit of tube 42 at low or zero voltage inputs, and against supply voltage fluctuations, negative feed-back is provided by means of a transformer 43 whose primary is energized by the A. C. component of the differential voltage output from tube 42. The secondary has a center-tap 87 connected in A. C. fashion to the cathodes through condenser 86, and the respective halves of the secondary winding are connected oppositely and in series with secondary windings 41', 41" of input transformer 41. Center-tap 87 is also connected to source 54 through a high resistor 88. Condenser 86 and resistor 88 serve to maintain the bias voltage across resistor 82 at a value sufficient to prevent grid current during instants of low instantaneous values of anode current, when the bias voltage would otherwise drop to a low value.

The output of tube 42 derived across resistor 46 is led through a rate-taking device including a condenser 45 and resistances 89, 90 to obtain the first derivative of the signal with respect to time—in other words, to obtain the rate of change of the signal. Preferably, also, a second derivative with respect to time of the control signal is obtained from a second rate circuit 47, 91, and the sum of these two signals, because of bypassing resistor 50 (which has components representing the first and second derivatives of the control or displacement signal), is connected in series with one secondary winding 48' of a transformer 48 and a secondary winding 52' of a further transformer 52. The resultant of these series-connected voltages is then applied to one control grid of a second duplex type vacuum tube 53. A similar rate-taking circuit 51 is energized from the voltage appearing across the other output resistor 46' of tube 42 and similarly produces a control voltage having components representing the first and second derivatives of the control voltage, but in opposite sense to the voltage produced by the first-mentioned rate circuit. This derivative voltage is connected in series with the voltages appearing across further secondary windings 48", and 52" of transformers 48 and 52, and the resultant voltage, which has opposite effect to that impressed on the first-mentioned grid of tube 53, is impressed upon the other control grid of tube 53.

The primary winding of transformer 48 is connected across terminals A and C of the input to the amplifier of Fig. 2. Accordingly, as shown in Fig. 2, the voltage supplied to transformer 48 will represent (in the case of the aileron control amplifier 24) the sum of the gyro signal derived from pick-off 25, the manual control voltage derived from the transmitter 20, and the bank correction voltage derived from the correction circuit 26, or will represent the sum of the gyro signal derived from pick-off 30 and the manual control voltage derived from transmitter 31 for the elevation amplifier 28. In this manner, a voltage proportional to the gyro signal and to the manually controlled signal (corrected for improper bank if it is the aileron signal) is added to the voltage representing the time derivatives of the gyro control signal. It will be seen that no derivatives will be taken of this latter voltage, which effectively bypasses the rate circuits described so long as the impedance of the primary of transformer 48 is high compared to the parallel impedance of the primary of transformer 41 and the corresponding gyro pick-off 25 or 30 connected thereto. This is a definite advantage, since otherwise, if the manual control signal also were operated upon by rate circuits, large magnitude rate components of this signal would be produced by a sudden change of setting of the manual bank or pitch controls, which would cause undesirable strains in the servo system and aircraft control system, and excessive working of the control surfaces. In addition, a voltage limiter 40, shown as comprising back-to-back connected rectifiers which may be of the copper oxide type, is inserted in series with a current-limiting resistor 40' across terminals A and C, and effectively serves to limit the voltage applied to transformer 48 to a suitably low value. This voltage limiter has been found to be important, since for large control signals caused by large manual displacements of the aileron or elevation controls, excessive control voltages may be applied to terminal A. If the gyro-pick-off signal, which normally opposes the manual control voltage, becomes limited for any reason, such excessive voltage, when applied to the respective servo systems, might cause the plane to dive or climb at an unsafe angle or to flip over on its back. Voltage limiter 40 permits control of the servo systems within safe limits of the operation thereof and prevents any such excessive action.

The use of the voltage limiter 40 also provides another advantage, even without the use of manual control signals, as in the rudder servo system. Normally, the amplifier tube 53 would saturate at an input voltage exceeding the maximum limit of the system. When in this saturated condition, full output is obtained from the servo system, but the gyro is ineffective to prevent any type of hunting, since any increase or decrease in signal has no effect on the servo output so long as saturation persists. By use of the voltage limiter 40, tube 53 is just kept from being saturated by the gyro displacement signal alone, so that a derivative of the gyro signal produced by the rate circuits described and tending to decrease the input voltage to tube 53, such as due to a yaw toward the desired course, would still be effective to prevent overshooting of the desired course. A derivative signal of opposite sense would be ineffective since the system is already providing maximum output in this direction, but this does not matter since no danger of hunting exists in this case.

The transformer 52 is energized by any other control factor by which it may be desired to control the particular servo system. For example, in the elevator servo system it is also desirable to control the servo by a signal representing the altitude or change in altitude. Such a signal may be added to the system by connection between terminals H and C (ground), whereby the signal is impressed on the primary winding of transformer 52 and serves to oppositely control the grids of tube 53 by means of secondary windings 52' and 52'' of transformer 52. If desired, or necessary, a voltage limiter similar to limiter 40 could be added to this input also. Such a limiter would prevent a large change in altitude from producing a very large signal which might override the gyro and manual signals, to actuate the ailerons and thus stall or dive the craft.

In this manner, the voltages applied to the grids of tube 53 represent by their difference the desired control action of the servo system including the anti-hunting voltage components necessary to maintain proper operation. The cathodes of tube 53 are connected to ground through a suitable cathode biasing resistor 93. The anodes of tube 53 are connected through respective output resistors 94 and 94' to source 54 described above, and thereby to ground. The screen grids of tubes 53 are supplied from source 54 through a voltage dropping resistor 95, whereby these screen grids are maintained instantaneously at the same polarity but of lower voltage than the anodes. Accordingly, tube 53 will serve to amplify the voltages differentially impressed upon its control grids and corresponding differential unidirectional voltages will appear across resistors 94, 94'.

The voltages appearing across resistors 94, 94' are impressed upon the respective control grids of a further amplifying tube 60, whose anodes are connected through the respective windings 61, 61' of the corresponding torque motor to ground at 34. In this way, source 54 also serves to supply energy to tube 60. However, it will be noted that during the periods when the anodes of tube 53 are positive, whereby this tube conducts and produces its output voltages across resistors 94, 94', the anodes of tube 60 are negative by virtue of the direct connection between the anodes of tube 53 and the cathodes of tube 60 to the common source 54, so that tube 60 could not utilize these output voltages. During the periods when the anodes of tube 60 are positive, those of tube 53 are negative, and therefore zero voltages would appear across resistors 94, 94' during the time when tube 60 could utilize them, thus preventing effective operation of the system.

To overcome this defect, a condenser 96 is connected across resistors 94, 94', which is charged up to the difference in the voltages across these resistors 94, 94' during the half cycles when the anodes of tube 53 are positive. During the succeeding half cycles, condenser 96 substantially maintains its charge, discharging only very slowly through resistors 94, 94' which now act as a voltage divider to impress balanced push-pull voltages upon the input grids of tube 60. In this way, condenser 96 serves to transmit or carry over only the differential voltage across resistors 94, 94' to the following tube 60 during these succeeding half cycles.

Coils 61, 61' are bypassed for A. C. by respective bypass condensers 97 and 97', and are thereby energized solely by direct current. The torque motor will therefore be actuated by the difference in the currents within its windings 61, 61' and will accordingly actuate the servo pilot valve in a sense and magnitude corresponding to the desired controlling action, in response to the signal supplied to the amplifier.

In order to further stabilize the amplifier and improve its operation, the output voltages appearing across the windings 61, 61' are fed back to the input of tube 53 in degenerative fashion by means of the coupling leads 98, 98' connected to resistors 90 and 90' in the input circuit of the grids of tube 53. These resistors 90, 90' are of a high value to prevent short-circuiting of windings 61, 61'. In this fashion, an amplifier is provided including desirable anti-hunting and voltage controlling features suitable for controlling the servomotors of the automatic pilot.

It is to be understood that the entire amplifier shown would be used only for the elevator servo amplifier 28. For the aileron servo amplifier 24 and for the rudder servo amplifier 5, terminal H may be left unconnected and, if desired, may be eliminated together with the transformer 52. For the rudder servo amplifier, where only a single signal is produced corresponding to a combination of the gyro and manual control signals of the aileron and elevator servo systems, terminal A would be connected to terminal B as shown in Fig. 1, whereby this single signal passes through the rate circuits described, but also bypasses the rate circuits unchanged, so that the voltage impressed upon the control grids of tube 53 contains components proportional to the strengh of the control signal (which is in turn proportional to displacement) and both the first and second time derivatives of displacement or departure from course.

Connections are shown at F and G for deriving a voltage from the rudder servo torque motor 6 corresponding to the deflection of the rudder 3. This signal is then fed to the bank correction circuit 26, whose output is used to correct the banking angle to improve the turn executed by the craft in the manner described above.

Fig. 3 shows a wiring diagram of this bank correction circuit 26. The unidirectional reversible-polarity input voltage impressed on terminals F, G is derived, as has been described, from the resultant voltage applied to the rudder torque motor 6. The bank correction circuit will be seen to be balanced and symmetric with respect to ground. Accordingly, one half of the input voltage appears between terminal F, for example, and ground. This voltage is applied to the two cascaded delay circuits, one comprising resistor 67 and condenser 65, and the other resistor 68 and condenser 66, the resultant unidirectional voltage appearing across condenser 66 being substantially the same as the input voltage except decreased in amplitude and delayed with respect thereto.

A portion of this voltage across condenser 66, derived from voltage divider 69, 70, is impressed upon one grid of a modulator tube 72. It will be apparent that a similar circuit exists between terminal G and ground and impresses upon the other control grid of tube 72 a similar delayed and reduced voltage of opposite polarity, the difference between the magnitudes of these two voltages being the total bank correction voltage. The cathodes of tube 72 are connected together and to ground through a cathode biasing resistor 101. Connected across the anodes of tube 72 is the primary winding of an output transformer 73 whose center-tap 102 is connected directly to source 54, whose other terminal is grounded at 84 and thereby completes the circuit to the cathode biasing resistor 101 and the cathodes of tube 72. The screen grids of modulator tube 72 are also connected to source 54 through a voltage dropping resistor 103.

Accordingly, any voltage appearing at the input terminals F, G will produce an unbalance in the respective ouput currents from the respective halves of tube 72. Since tube 72 will conduct only during the positive half cycles of source 54, the resulting voltage appearing across the primary of transformer 73 will have a wave shape corresponding to a half-wave-rectified alternating voltage. In order to improve the wave shape of this voltage, a condenser 104 is connected across the primary of transformer 37 and tunes the inductance of the primary to the frequency of source 54, whereby, by the flywheel effect of this resonant circuit, a substantially pure alternating voltage is impressed on transformer 73.

Transformer 73 is provided with a plurality of secondary windings such as 106, 107 and 108. Winding 106 is connected to the output terminals D, E which are connected in series with the signal actuating the aileron servo amplifier in the manner shown in Fig. 1. This voltage will thus be an alternating voltage having a magnitude corresponding to the amplitude of the D. C. signal impressed across the terminals F, G and a phase corresponding to the polarity of this input signal, and hence will correspond to the signal actuating the rudder 3 during the turn. As stated above, the output derived from terminals D, C modifies the bank signal to produce the proper angle of bank for the given turn, and may be termed the bank correction signal voltage.

The second winding 107 of transformer 73 is used to provide negative feed-back for tube 72, to stabilize and improve the operation thereof. For this purpose, the center-tap of winding 107 is grounded and the other terminals are led back to the control grids of tube 72 through respective coupling and blocking condensers 111 and 112.

The third winding 108 of transformer 73 is impressed across a voltage limiting circuit 110 similar to voltage limiter 40, discussed above, which serves to short-circuit secondary winding 108 when the voltage across terminals D, E exceeds a predetermined value. By so short-circuiting the secondary winding 108, the secondary winding 106 is effectively short-circuited, and the output voltage thereof is reduced. In this manner, the bank correction voltage is maintained below a suitable safe value.

Hence, it will be seen that the bank correction circuit serves to derive from a persistent rudder signal a delayed alternating reversible-phase signal suitable for combination with the signals produced by the bank transmitter 20 and the roll pick-off 25.

The present system offers advantages even during straight flight. If the craft should be laterally out of trim, so that a persisting rudder signal is required to maintain course, the present invention would produce a bank correction signal therefrom which would tend to eliminate the out-of-trim condition by readjusting the ailerons.

Although the bank correction circuit 26 has been shown in Fig. 3 as having a two-stage delay network, it is to be understood that any number of stages may be utilized, depending upon the requirements of the system. Also, while in Fig. 1 the bank correction signal has been shown as inserted in series with the bank control signal bypassing the rate circuits of the aileron amplifier of Fig. 2, it is to be understood that if desired, this bank correction signal could be inserted directly in series with the gyro signal and could undergo differentiation together with the gyro signal in the rate circuit of Fig. 2. In such case, however, additional delay would have to be provided between terminals F, G and the output D, E of the bank correction circuit 26, in order to counteract the effect of the differentiation process, which effectively advances the signal so as to leave a net delay for the bank correction signal despite the counteracting effect of the rate circuits.

Also, if desired, the bank correction signal could be introduced into the aileron amplifier 24 by connection to the terminal H thereof shown in Fig. 2, otherwise unused in the aileron amplifier 24.

It is to be noted that by the present system a banking effect will be produced by change of course even without actuation of the turn and bank control 15. Thus, if a change of course is "ordered" or set in by displacement of course control 10, a corresponding signal will be introduced into the rudder servo amplifier 5 which will produce a voltage across the torque motor coils to actuate the servo control valve 7, and hence correspondingly to deflect the rudder 3 to change the course. The bank correction circuit 26 will take this rudder signal controlling torque motor 6 and will modify the bank control system of the craft to automatically bank the craft.

The system may be so designed that this effect alone will be sufficient to provide proper banking during the turn. However, the automatic bank provided by signal 20 has the advantage that it produces a bank signal instantaneously, even though it may not be of exactly the proper value to produce the correct bank, so that the plane is banked as it enters a turn, as is desirable, whereas by operation of bank circuit 26 alone, a certain amount of skidding may occur, due to the delay in producing the bank. We prefer, therefore, to use both methods and make the bank correction circuit output smaller than would be necessary if the entire banking of the craft were to be controlled thereby, since it merely needs to correct for the amount by which the signal produced by bank transmitter 20 differs from the signal corresponding to the correct value of bank, which difference will normally be less than the actual total bank signal.

It is obvious that the broad aspects of our invention are applicable to automatic pilots and servo systems of types other than selected for illustration of the invention, thus being applicable to differential air flow pick-off systems as well as to electrical pick-off or signal producing systems. It is also obvious that the electro-hydraulic servomotor system illustrated is typical only and, if desired, might readily be replaced by an all-electric servo system such, for instance, as illustrated in the prior joint application of the present joint applicants together with O. E. Esval and J. L. Bird, filed June 22, 1942, Serial No. 448,040, for Electrical control systems. In such case, the windings 61 and 61' would represent the opposed field windings 237, 239 of the Ward-Leonard generator 241.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic banking means for aircraft, the combination of a rudder servomotor, an aileron servomotor, means for producing separate control signals for each, said rudder servo signal producing means including a variable speed device for providing predetermined rate of turn references, means actuated in accordance with the rate set thereon producing a third signal, and means for combining said third signal with the control signal for the aileron servo to produce a bank proportional to the rate of turn.

2. Means for securing correctly banked turns in an automatically piloted aircraft including a course reference device, an attitude reference device, a rate of turn initiating device, signal means operated from each of said devices, a rudder servo amplifier operated jointly from signals derived from said course reference and turn initiating devices, an aileron servo amplifier controlled by both the signals derived from said attitude reference device and said turn initiating devices, and means responsive to persistent output of said rudder servo amplifier for also controlling said aileron servo amplifier.

3. In an automatic pilot for aircraft, a standard of position, means for obtaining therefrom a signal proportional to displacement of the craft from said position, a servomotor, amplifying means for said signal for controlling the servomotor, said amplifying means including a rate-taking circuit for producing a control proportional to both displacement and rate of displacement, a second signal-producing means for causing change of attitude of the craft with respect to said standard of position, and means for applying said signal to said amplifier exclusive of said rate-taking circuit.

4. An automatic pilot as claimed in claim 3, having a voltage limiter between said change signal and said amplifier for the purpose specified to prevent excessive displacement of the control surfaces.

5. In an automatic banking means for aircraft, the combination of a rudder servomotor, an aileron servomotor, means for producing separate control signals for each, delayed action means for combining said signals, in such manner that a banking signal is produced upon a continuing unidirectional rudder signal, and means for preventing the aileron signal primarily derived from said rudder signal from rendering ineffective the main control of said aileron servomotor from its primary signal.

6. An automatic pilot for aircraft, comprising servo means for controlling the course of the craft, additional servo means for controlling the banking of the craft, control means for said servo means, said control means including means for effecting a desired rate of turn of the craft together with an approximately correct bank for such rate through joint operation of both said servo means, said control means further including means responsive to continued operation of said course change servo means during a turn, and means for effecting therefrom readjustment of the banking servo means until such course change servomotor ceases to operate.

7. In a control system for a dirigible craft, first and second electrical signal generators each having a stator and rotor element, means for rotating said craft about an axis thereof including control means therefor responsive to the signal outputs of said generators, gyroscopically controlled means for positioning one of the elements of a first of said generators, the other element of said first generator being movable with said craft, and manually adjustable means for effecting relative movement of the elements of the other generator to alter the attitude of the craft.

8. A control system for aircraft having a rudder and ailerons, a rudder servo and an aileron servo, respective control means therefor, a directional gyro and a gyro vertical, a pair of signal-generating pick-off means associated respectively with said gyros and connected respectively with said control means, manually controlled means for providing a desired rate of turn reference, and a pair of signal-generating means associated with said reference means, one of said pair being connected in signal-combining relation with the control means for said rudder servo and with the directional gyro pick-off to supply a signal responsive to the difference between the desired and actual rate of turn of said craft and the other pair being connected in signal-combining relation with the gyro vertical pick-off and the control means for said aileron servo for causing a bank proportional to the rate of turn set in manually.

9. Means for securing correctly banked turns in an automatically piloted aircraft including a course or heading reference device, an attitude reference device and a pick-off on each producing a signal upon relative change of heading or attitude of the craft and their respective reference devices, a single means for altering said course signal at a predetermined rate and said bank signal an amount proportionate to said rate for effecting the desired rate of turn and proportionate bank of the craft, and delayed action means responsive to a persistent signal from the pick-off on said heading device for altering the signal from said second pick-off to thereby alter the banking angle of the craft until said first signal disappears.

10. In an automatic pilot for aircraft having ailerons and a rudder, servo means for controlling the ailerons and rudder of the craft, a single control means including means for providing a variable rate-of-turn reference for controlling said servo means to effect a turn at a selected rate and simultaneously a proportionate bank of said craft, and means for automatically modifying the bank angle of the craft upon persistence of rudder deflection.

11. In an automatic pilot for dirigible craft, the combination with a reference maintaining device and a remote adjustable means for changing course, a pair of interconnected electrical signal generators adapted to produce a reversible signal upon loss of synchronism between the positions of said generators, a reversible servomotor caused to operate from said signal in a direction to turn the craft in a direction to erase said signal, the rotor of one generator being positioned by the reference maintaining device and the rotor of the other generator being positionable by said adjustable means, whereby course changes may be effected by adjustment of said remote adjustable means at a point remote from said reference device.

12. In an automatic pilot for dirigible craft, the combination with a reference maintaining device and a remote variable speed device for causing a turn of the craft at a selected rate, a pair of interconnected electrical signal generators, a servomotor actuated by the differential output of said generators, the rotor of one generator being positioned by the reference maintaining device with the stator fixed on the craft and the rotor of the other generator being turned by said variable speed means, whereby turn of the craft at a selected rate may be maintained.

13. In an automatic pilot for dirigible craft, manually adjustable means for causing a predetermined course change, a variable speed device, a second manually adjustable means for controlling said device, a remotely located reference maintaining device, a pair of interconnected electrical signal generators, a rudder servomotor actuated by the differential output of said generators, the rotor of one generator being positioned by said reference device with the stator fixed on the craft, both parts of the other generator being rotatable, one part being turnable by said first manual means and the other part by said variable speed device, whereby course changes at a predetermined rate or of a selected amount may be effected.

14. In an automatic banking means for aircraft, the combination of a rudder servomotor, an aileron servomotor, means for producing a turn signal for the rudder motor, means for producing a bank signal for the aileron motor upon the production of said turn signal proportional to the rate of turn, and delayed action means for producing a further bank signal upon persistence of rudder signal after a banked turn has been established, whereby the initially established banking angle is corrected.

15. In an automatic pilot for aircraft, a positional reference device, means for positioning said craft, control means for said craft-positioning means adapted to produce a signal proportional to displacement of the craft from a predetermined relation to said device, a second control means for said craft-positioning means adapted to produce a second signal causing departure of said craft from the said predetermined relation thereof to said device, differentiating means for obtaining a third signal proportional to the rate of change of said first signal only, and means for supplying a resultant of all of said signals to control said craft-positioning means.

16. An automatic pilot for aircraft as claimed in claim 15, having means for limiting the strength of said second signal whereby over-control from the same is prevented.

17. In an automatic pilot for aircraft, an attitude gyroscope for controlling the craft about the roll axis, servo means for positioning the ailerons to effect such control, a signal generating means adapted to produce a signal for said servo means proportional to the amount of roll of the craft from a predetermined relation to said attitude gyroscope, a second signal producing means for said servo means adapted to produce a second signal upon continued turning of the craft in azimuth for automatically banking the craft, differentiating means for obtaining a third signal proportional to the rate of change of said first signal only, and means for supplying the resultant of all of said signals to control said servomotor.

18. In an automatic banking means for aircraft, the combination of a rudder servomotor, an aileron servomotor, means for producing separate control signals for each, additional means for producing another bank signal for said aileron motor coincidentally with a turn signal for said rudder motor, whereby an approximately correctly banked turn is obtained, and delayed action means for producing a further bank signal which is combined with said other bank signal upon continued unidirectional rudder signal.

19. In an automatic pilot for aircraft, a positional reference device, means for positioning said craft, control means for said craft-positioning means adapted to produce a signal proportional to displacement of the craft from a predetermined relation to said device, a second control means for said craft-positioning means adapted to produce a second signal causing departure of said craft from the said predetermined relation, differentiating means for obtaining a third signal proportional to the rate of change of said first signal only, means for supplying a resultant of all said signals to control said craft-positioning means, and means for limiting the strength of said second signal to maintain control and prevent hunting at all times.

20. An automatic pilot control system for aircraft, comprising a pair of Selsyn signal generator units each having a stator and a rotor element, a single-phase supply for one of said units, a servomotor electrically controlled from the output of the other of said units for positioning a control surface of said craft, a position-maintaining device for positioning the rotor of one of said units, the stator thereof being fixed to the craft, and a manual control means for controlling the position of one of the elements of the other of said units, whereby the attitude of the craft may be altered at will through said manual control means at a point remote from said position-maintaining means.

21. A control system of the character recited in claim 20 in which one of said control means is adapted to effect rotation of the element positioned thereby relative to its associated element at a predetermined rate.

22. In an automatic pilot for controlling the rudder of a craft, a directional gyroscope, a variable speed device, a Selsyn transformer connected to the speed device to be rotated thereby at a preselected rate, manual means for selecting such rate, a Selsyn transformer at the directional gyroscope adapted to be displaced upon relative turning of the craft and gyro, said transformers being interconnected to produce a signal upon disagreement in their positions, and a servomotor actuating said rudder controlled by said signal, whereby a zero signal is produced and the rudder is centralized not only when the craft is on its predetermined heading, but also when turning at the rate set into said variable speed drive by said manual means.

23. Means for obtaining correctly banked turns in an automatically piloted aircraft including a course determining device, an attitude determining device, means for setting in a desired rate of turn and a proportionate bank through said course determining device and attitude determining device, respectively, and means under control of said course determining device responsive to departure of the craft from said desired rate of turn for correcting the banking angle to maintain the craft at the desired rate of turn.

CARL A. FRISCHE.
PERCY HALPERT.
JEFFERSON R. WILKERSON.

REFERENCES CITED

The following references are of record in the file of this patent:

UNITED STATES PATENTS

| Number | Name | Date |
|---|---|---|
| 2,283,754 | Matthews | May 19, 1942 |
| 2,293,889 | De Florez | Aug. 25, 1942 |
| 2,162,862 | Protzen | June 20, 1939 |
| 2,315,501 | Crane, et al. | Apr. 6, 1943 |
| 2,091,300 | Bassett, et al. | Aug. 31, 1937 |
| 2,143,140 | Carlson | Jan. 10, 1939 |
| 2,234,326 | Tiebel | Mar. 11, 1941 |
| 2,188,834 | Fischel, et al. | Jan. 30, 1940 |
| 2,317,383 | Hull | Apr. 27, 1943 |
| 2,190,390 | Thiry | Feb. 13, 1940 |
| 2,270,875 | Hanson, et al. | Jan. 27, 1942 |
| 1,612,117 | Hewlett, et al. | Dec. 23, 1926 |

Certificate of Correction

Patent No. 2,415,430.                                  February 11, 1947.

CARL A. FRISCHE ET AL.

It is hereby certified that errors appear in the printed specification of the above numbered patent requiring correction as follows: Column 3, line 63, for the word "chance" read *change*; column 13, line 58, claim 4, strike out "for the purpose specified"; and that the said Letters Patent should be read with these corrections therein that the same may conform to the record of the case in the Patent Office.

Signed and sealed this 30th day of September, A. D. 1947.

[SEAL]

THOMAS F. MURPHY,
*Assistant Commissioner of Patents.*